2,956,973

VINYL ACETATE POLYMER LATICES, PROCESS FOR PREPARING SAME AND PAINT COMPOSITIONS MADE THEREFROM

Robert S. Holdsworth, Needham, Mass., assignor to United States Rubber Company, New York, N.Y., a corporation of New Jersey No Drawing. Filed Apr. 2, 1957, Ser. No. 650,103

12 Claims. (Cl. 260—29.6)

This invention relates to vinyl acetate polymer latices and to paints made therefrom.

I have found that vinyl acetate polymer latices that are exceptionally stable to mechanical and chemical influences and that may be made into paints that will withstand freezing and thawing cycles may be prepared by the alkali persulfate catalyzed polymerization of the monomers in aqueous emulsion with the emulsifying agent consisting of a particular non-ionic surface-active agent. I have further found that heat discoloration of films prepared from such latices may be prevented by including a small amount of certain metal hydroxides or oxide in the polymerization recipe.

The monomers from which the latices of the present invention may be prepared are vinyl acetate and mixtures of vinyl acetate with up to 40% of said mixture of material copolymerizable with vinyl acetate selected from the group consisting of dialkyl maleates and dialkyl fumarates having two to eight carbon atoms in the alkyl radicals, vinyl esters of alkanoic acids having three to eight carbon atoms in the alkanoic group, and alkyl esters of acrylic acid and methacrylic acids having one to eighteen carbon atoms in the alkyl esterifying radical. The polymerization catalyst is a conventional alkali persulfate, viz. potassium, sodium, lithium or ammonium persulfate. The emulsifying agent is a polyoxyethylene-polyoxypropylene glycol in which the polyoxypropylene chain has a molecular weight from 800 to 2100 and the polyoxyethylene content is from 40% to 90% by weight of the total molecule, for example, a polyoxyethylene-polyoxypropylene glycol in which the polyoxypropylene chain has a molecular weight from 1500 to 1800 and the polyoxyethylene content is from 80 to 90 percent by weight of the total molecule. The polyoxyethylene-polyoxypropylene glycols are made in known manner by reacting an amount of ethylene oxide to give the desired polyoxyethylene content of the final molecule with a polyoxypropylene glycol having the number of propylene oxides in the chain desired in the final molecule. The final compounds may be designated as having the structural formula

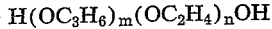

$$H(OC_3H_6)_m(OC_2H_4)_nOH$$

wherein the molecular weight of $(OC_3H_6)_m$ is 800 to 2100 and $(OC_2H_4)_n$ is 40% to 90% by weight of the molecule. The polyoxypropylene chain and the polyoxyethylene chain are distinct and have different functions, the polyoxypropylene chain of the indicated molecular weight or length being the hydrophobic element or portion of the surface-active agent and the polyoxyethylene chain being the hydrophilic element or portion.

In preparing the vinyl acetate polymer latex (i.e. homopolymer or copolymer latex) of the present invention, 100 parts of the polymerizable monomers are polymerized by heating at conventional polymerizing temperature between 120° F. and 200° F., and preferably between 150° F. and 180° F. in aqueous emulsion in 60 to 120 (preferably 75 to 90) parts of water containing 0.05 to 0.75 (preferably 0.1 to 0.4) part of alkali persulfate catalyst (preferably potassium persulfate), and 1 to 10 (preferably 3 to 6) parts of the polyoxyethylene-polyoxypropylene glycol emulsifying agent. The polymerization may be carried to the desired conversion of monomers, generally substantially complete conversion. The materials may all be charged into the reactor initially, or some withheld and added during the course of the polymerization. Latices thus prepared are stable to mechanical and chemical influences and may be made into paints that will withstand thawing and freezing cycles. Films made from such latices tend to discolor as shown by their developing a brown color when tested by exposure in an oven at a temperature of 100° C. for 70 hours. Such discoloration is not desired in light color paints, although it may be satisfactory in dark colored paints. I have found that the inclusion of 0.05 to 1 (preferably 0.1 to 0.4) part of sodium hydroxide or lithium hydroxide or magnesium oxide in the polymerization recipe eliminates such discoloration of films cast from the latex. Potassium hydroxide and ammonium hydroxide do not eliminate such discoloration. The present preferred vinyl polymer latex is a latex of a copolymer of 65 to 85 parts of vinyl acetate and correspondingly 35 to 15 parts of dibutyl maleate.

Paints may be prepared from the vinyl acetate polymer latices of the present invention by mixing such latices with aqueous dispersions of pigments. Such pigment dispersions for mixing with resin latices in making so-called latex paints are conventional, and are made in an infinite variety of recipes by paint compounders for various uses. The pigments in the dispersions may be titanium dioxide (anatase or rutile grade), mica, lithopone, clay, talc, silica, barium sulfate, zinc sulfide and the like. The pigment dispersions generally contain dispersing agents, such as anionic dispersing agents, e.g. soaps, alkyl sulfonates, alkyl sulfates, alkylated aryl sulfonates, aryl sulfonateformaldehyde condensation products, and non-ionic dispersing agents, e.g. monoesters of polyglycols with long chain fatty acids and monoethers of polyglycols with long chain fatty alcohols or alkylated phenols, and may contain stabilizing and thickening agents, such as hydrophilic colloidal substances, e.g. starch, casein, vegetable gums, methyl cellulose, sodium carboxymethyl cellulose and sodium polyacrylate, and anti-foaming agents, and preservative. The paint will generally contain between 15 to 150 parts of vinyl acetate polymer per 100 parts of pigment, and the solids concentration of the paint will generally be between 35 and 60%.

The following examples illustrate the invention. All parts and percentages referred to herein are by weight.

Example 1

In a 500 gallon glass lined vessel, fitted with an agitator, there was charged 221 gallons (80 parts) of water, 11.5 pounds (0.5 part) of a polyoxyethylene-polyoxypropylene glycol in which the polyoxypropylene chain had a molecular weight from 1500 to 1800 and the polyoxyethylene content was about 80% by weight of the total molecule, 4.6 pounds (0.2 part) of potassium hydroxide and 9.2 pounds (0.4 part) of potassium persulfate, and 240.4 pounds of a mixture of 175 pounds (7.7 parts) of vinyl acetate, 53.0 pounds (2.3 parts) of dibutyl maleate and 10.4 pounds (0.45 part) of the same polyoxyethylene-polyoxypropylene glycol as above. The mixture was heated to 150° F.–160° F. with agitation for one-half an hour after which a mixture of 1593 pounds (69.3 parts) of vinyl acetate, 477 pounds (21.7 parts) of dibutyl maleate monomers and 93.15 pounds (4.05 parts) of the above polyoxyethylene-polyoxypropylene glycol was added continuously over a period of 10 hours, and after the monomers were all in, heating was continued for 4 hours to substantially total conversion and about 55.2% solids content copolymer latex was obtained. The batch was then cooled and removed from the reactor.

The thus prepared latex was tested for mechanical stability and chemical stability as follows:

Mechanical stability is evaluated by stirring 100 gm. of the latex in a high speed stirrer (Hamilton Beach stirrer) operating at 15,000 r.p.m. for 30 minutes. The latex is then strained through a 100 mesh screen, and the coagulum on the screen dried and weighed. In the test on the above latex, the coagulum was 0.06 gm. per 100 gm. of the latex (called 0.06% coagulum).

Chemical stability is evaluated by adding a 5% solution of alum or calcium chloride to 100 gm. of the latex and measuring the amount (cc.) of such salt solution that will cause flocculation of the latex. If no flocculation occurs when 50 cc. of the salt solution has been added, the chemical stability is satisfactory. In the test on the above latex, the latex did not flocculate on addition of the 50 cc. of 5% alum solution.

A paint was prepared from the above latex by mixing an aqueous dispersion of pigment, or co-called pigment grind, containing dispersing agents, with the above latex according to the following recipe which also contained conventional stabilizing and thickening agent, antifoaming agent, and preservative:

| Pigment grind: | Lbs./100 gallons |
|---|---|
| Titanium dioxide (rutile) | 233.5 |
| Titanium dioxide (anatase) | 25.0 |
| Mica | 29.0 |
| Water | 93.4 |
| Anionic surface-active dispersing agent (25% in water) | 5.6 |
| Diethyleneglycol monoethyl ether (coalescing aid) | 34.0 |
| Non-ionic surface-active dispersing agent | 2.0 |
| Propylene glycol (antifoaming agent) | 1.0 |
| Stabilizer and preservative: | |
| Methyl cellulose stabilizer and thickener, 4000 cp. (2% in water) | 164.0 |
| Sodium salt of ortho-phenyl phenol preservative (20% in water) | 11.5 |
| Propylene glycol | 1.0 |
| Latex: | |
| Above vinyl acetate-dibutyl maleate copolymer latex (55% solids content) | 409.0 |
| Water | 75.5 |

The freezing and thawing resistance of paints made from resin latices is evaluated by repeatedly exposing one-half pint of the paint to be tested in a one pint can to −12° C. for 16 hours and thawing for 8 hours at room temperature. The viscosity of the paint is measured initially and after each freezing and thawing cycle. Excessive viscosity rise or formation of coagulum after a freezing or thawing cycle is taken as the end point. A satisfactory paint should withstand 5 freezing and thawing cycles without appreciable change. The above paint satisfactorily withstood the five freezing and thawing cycles.

Example 2

When the latex of Example 1 was cast in a film which was exposed in an oven at a temperature of 100° C. for 70 hours in an accelerated discoloration test, a light brown color developed. This would be undesirable for light colored paints but might not be unsatisfactory for dark colored paints. Omitting the potassium hydroxide from the latex recipe of Example 1 still gave a brown discoloration in the test. Substituting ammonium hydroxide for the potassium hydroxide also gave a brown discoloration in the test. However, substituting sodium hydroxide, or lithium hydroxide, or magnesium hydroxide for the potassium hydroxide in the latex recipe of Example 1 showed practically no discoloration in the test, and gave latices suitable for compounding into light colored paints as well as dark colored paints.

Example 3

Various other vinyl acetate polymer latices were prepared similarly to the latex of Example 1, and formulated into paints similarly to the paint of Example 1. Polyvinyl acetate homopolymer latex and a copolymer latex of 65 parts of vinyl acetate and 35 parts of dibutyl maleate was thus prepared. Also copolymer latices of 77 parts of vinyl acetate and 23 parts of ethyl acrylate, and 80 parts of vinyl acetate and 20 parts of dibutyl fumarate, and 90 parts of vinyl acetate and 10 parts of vinyl 2-ethyl hexoate were similarly prepared. Also latices were prepared according to the recipe of Example 1 except that other emulsifying agents were used, viz. a polyoxyethylene-polyoxypropylene glycol with the polyoxypropylene chain having a molecular weight of 800 to 1000 and a polyoxyethylene content of 80 to 90% of the weight of the molecule, and a polyoxyethylene-polyoxypropylene glycol with the polyoxypropylene chain having a molecular weight of 1500 to 1800 and a polyoxyethylene content of 40 to 50% of the weight of the molecule. All these latices gave satisfactory small amounts of coagulum, in the mechanical stability test and showed no increase in viscosity on addition of 50 cc. of 5% alum solution to 100 gm. of the latices. They all withstood five freezing and thawing cycles when made up into paints similarly to Example 1.

Example 4

A latex was prepared similarly to the latex of Example 1 except that the non-ionic polyoxyethylene-polyoxypropylene glycol emulsifying agent of Example 1 was substituted by 1 part of decyl benzene sodium sulfonate and 0.2 part of the sodium salt of naphthalene sulfonic acid condensed with formaldehyde, both anionic surface-active agents. In the mechanical stability test on the latex, complete coagulation resulted from the high speed stirring. In the chemical stability test on the latex, the latex flocculated on addition of 2 cc. of the 5% alum solution. Paint made from the latex coagulated in the freezing and thawing test.

In view of the many changes and modification that may be made without departing from the principles underlying the invention, reference should be made to the appended claims for an understanding of the scope of the protection afforded the invention.

Having thus described my invention, what I claim and desire to protect by Letters Patent is:

1. A process for preparing a vinyl acetate polymer latex which comprises subjecting to polymerizing temperature of 120° F. to 200° F. 100 parts of polymerizable material selected from the group consisting of vinyl acetate and mixtures of vinyl acetate with up to 40% of said mixture of material copolymerizable with vinyl acetate selected from the group consisting of dialkyl maleates and dialkyl fumarates having two to eight carbon atoms in the alkyl radicals, vinyl esters of alkanoic acids having three to eight carbon atoms in the alkanoate group, and alkyl esters of acrylic and methacrylic acids having one to eighteen carbon atoms in the alkyl esterifying radical, in 60 to 120 parts of water containing 0.05 to 0.75 part of alkali persulfate, and 1 to 10 parts of a polyoxyethylene-polyoxypropylene glycol in which the polyoxypropylene chain has a molecular weight from 1500 to 1800 and the polyoxyethylene content is from 80 to 90 percent by weight of the total molecule.

2. A process for preparing a vinyl acetate polymer latex which comprises subjecting to polymerizing temperature of 120° F. to 200° F. 100 parts of polymerizable material selected from the group consisting of vinyl acetate and mixtures of vinyl acetate with up to 40% of said mixture of material copolymerizable with vinyl acetate selected from the group consisting of dialkyl maleates and dialkyl fumarates having two to eight carbon atoms in the alkyl radicals, vinyl esters of alkanoic acids having three to eight carbon atoms in the alkanoate group, and alkyl esters of acrylic and methacrylic acids having one to eighteen carbon atoms in the alkyl esterifying radical, in 60 to 120 parts of water containing 0.05 to 0.75 part of alkali persulfate, and 1 to 10 parts of a polyoxyethylene-polyoxypropylene glycol in which the polyoxypropylene chain has a molecular weight from 1500 to 1800 and the polyoxyethylene content is from 80 to 90 percent by weight of the total molecule, and 0.05 to 1 part of material selected from the group consisting of sodium hydroxide, lithium hydroxide and magnesium oxide.

3. A process for preparing a vinyl acetate polymer latex which comprises subjecting to polymerizing temperature of 120° F. to 200° F. 100 parts of a mixture of 65 to 85 parts of vinyl acetate and correspondingly 35 to 15 parts of dibutyl maleate in 60 to 120 parts of water containing 0.05 to 0.75 part of alkali persulfate, and 1 to 10 parts of a polyoxyethylene-polyoxypropylene glycol in which the polyoxypropylene chain has a molecular weight from 1500 to 1800 and the polyoxyethylene content is from 80 to 90 percent by weight of the total molecule.

4. A process for preparing a vinyl acetate polymer latex which comprises subjecting to polymerizing temperature of 120° F. to 200° F. 100 parts of a mixture of 65 to 85 parts of vinyl acetate and correspondingly 35 to 15 parts of dibutyl maleate in 60 to 120 parts of water containing 0.05 to 0.75 part of alkali persulfate, and 1 to 10 parts of a polyoxyethylene-polyoxypropylene glycol in which the polyoxypropylene chain has a molecular weight from 1500 to 1800 and the polyoxyethylene content is from 80 to 90 percent by weight of the total molecule, and 0.05 to 1 part of material selected from the group consisting of sodium hydroxide, lithium hydroxide and magnesium oxide.

5. A paint composition comprising a mixture of an aqueous dispersion of pigment and a vinyl acetate polymer latex of polymerized resin-forming monomers selected from the group consisting of vinyl acetate and mixtures of vinyl acetate with up to 40% of said mixture of material copolymerizable with vinyl acetate selected from the group consisting of dialkyl maleates and dialkyl fumarates having two to eight carbon atoms in the alkyl radicals, vinyl esters of alkanoic acids having three to eight carbon atoms in the alkanoic group, and alkyl esters of acrylic and methacrylic acids having one to eighteen carbon atoms in the alkyl esterifying radical, said latex containing 1 to 10% based on the vinyl acetate polymer of a polyoxyethylene-polyoxypropylene glycol in which the polyoxypropylene chain has a molecular weight from 1500 to 1800 and the polyoxyethylene content is from 80 to 90 percent by weight of the total molecule which was present during the polymerization process, said vinyl acetate polymer being present in amount from 15 to 150 parts per 100 parts of said pigment.

6. A paint composition comprising a mixture of an aqueous dispersion of pigment and a vinyl acetate polymer latex of polymerized resin-forming monomers selected from the group consisting of vinyl acetate and mixtures of vinyl acetate with up to 40% of said mixture of material copolymerizable with vinyl acetate selected from the group consisting of dialkyl maleates and dialkyl fumarates having two to eight carbon atoms in the alkyl radicals, vinyl esters of alkanoic acids having three to eight carbon atoms in the alkanoic group, and alkyl esters of acrylic and methacrylic acids having one to eighteen carbon atoms in the alkyl esterifying radical, said latex containing 1 to 10% based on the vinyl acetate polymer of a polyoxyethylene-polyoxypropylene glycol in which the polyoxypropylene chain has a molecular weight from 1500 to 1800 and the polyoxyethylene content is from 80 to 90 percent by weight of the total molecule which was present during the polymerization process, and also containing 0.05 to 1% based on the vinyl acetate polymer of material selected from the group consisting of sodium hydroxide, lithium hydroxide and magnesium oxide which was present during the polymerization process, and said vinyl acetate polymer being present in amount from 15 to 150 parts per 100 parts of said pigment.

7. A paint composition comprising a mixture of an aqueous dispersion of 100 parts of pigment and a latex containing 15 to 150 parts of a copolymer of 65 to 85 parts of vinyl acetate and correspondingly 35 to 15 parts of dibutyl maleate, said latex containing 1 to 10% based on the vinyl acetate-dibutyl maleate copolymer of a polyoxyethylene-polyoxypropylene glycol in which the polyoxypropylene chain has a molecular weight from 1500 to 1800 and the polyoxyethylene content is from 80 to 90 percent by weight of the total molecule which was present during the polymerization process.

8. A paint composition comprising a mixture of an aqueous dispersion of 100 parts of pigment and a latex containing 15 to 150 parts of a copolymer of 65 to 85 parts of vinyl acetate and correspondingly 35 to 15 parts of dibutyl maleate, said latex containing 1 to 10% based on the vinyl acetate-dibutyl maleate copolymer of a polyoxyethylene-polyoxypropylene glycol in which the polyoxypropylene chain has a molecular weight from 1500 to 1800 and the polyoxyethylene content is from 80 to 90 percent by weight of the total molecule which was present during the polymerization process, and said latex also containing 0.05 to 1% based on the vinyl acetate-dibutyl maleate copolymer of material selected from the group consisting of sodium hydroxide, lithium hydroxide and magnesium oxide which was present during the polymerization process.

9. A vinyl acetate polymer latex of polymerized resin-forming monomer selected from the group consisting of vinyl acetate and mixtures of vinyl acetate with up to 40% of said mixture of material copolymerizable with vinyl acetate selected from the group consisting of dialkyl maleates and dialkyl fumarates having two to eight carbon atoms in the alkyl radicals, vinyl esters of alkanoic acids having three to eight carbon atoms in the alkanoic group, and alkyl esters of acrylic and methacrylic acids having one to eighteen carbon atoms in the alkyl esterifying radical, said latex containing 1 to 10% based on the vinyl acetate polymer of a polyoxyethylene-polyoxypropylene glycol in which the polyoxypropylene chain has a molecular weight from 1500 to 1800 and the polyoxyethylene content is from 80 to 90 percent by weight of the total molecule which was present during the polymerization process.

10. A vinyl acetate polymer latex of polymerized resin-forming monomer selected from the group consisting of vinyl acetate and mixtures of vinyl acetate with up to 40% of said mixture of material copolymerizable with vinyl acetate selected from the group consisting of dialkyl maleates and dialkyl fumarates having two to eight carbon atoms in the alkyl radicals, vinyl esters of alkanoic acids having three to eight carbon atoms in the alkanoic group, and alkyl esters of acrylic and methacrylic acids having one to eighteen carbon atoms in the alkyl esterifying radical, said latex containing 1 to 10% based on the vinyl acetate polymer of a polyoxyethylene-polyoxypropylene glycol in which the polyoxypropylene chain has a molecular weight from 1500 to 1800 and the polyoxyethylene content is from 80 to 90 percent by weight of the total molecule which was present during the polymerization process, and also containing 0.05 to 1% based on the vinyl acetate polymer of material selected from the group consisting of sodium hydroxide, lithium hydroxide and magnesium oxide which was present during the polymerization process.

11. A latex of a copolymer of 65 to 85 parts of vinyl acetate and correspondingly 35 to 15 parts of dibutyl maleate, said latex containing 1 to 10% based on the vinyl acetate-dibutyl maleate copolymer of a polyoxyethylene-polyoxypropylene glycol in which the polyoxypropylene chain has a molecular weight from 1500 to 1800 and the polyoxyethylene content is from 80 to 90 percent by weight of the total molecule which was present during the polymerization process.

12. A latex of a copolymer of 65 to 85 parts of vinyl acetate and correspondingly 35 to 15 parts of dibutyl maleate, said latex containing 1 to 10% based on the vinyl acetate-dibutyl maleate copolymer of a polyoxyethylene-polyoxypropylene glycol in which the polyoxypropylene chain has a molecular weight from 1500 to 1800 and the polyoxyethylene content is from 80 to 90 percent by weight of the total molecule which was present during the polymerization process, and said latex also containing 0.05 to 1% based on the vinyl acetate-dibutyl maleate copolymer of material selected from the group consisting of sodium hydroxide, lithium hydroxide and magnesium oxide which was present during the polymerization process.

References Cited in the file of this patent
UNITED STATES PATENTS

| | | |
|---|---|---|
| 2,125,527 | Tyce et al. | Aug. 2, 1938 |
| 2,457,261 | Morrison et al. | Dec. 28, 1948 |
| 2,508,342 | Wilson | May 16, 1950 |
| 2,694,052 | Canterino | Nov. 9, 1954 |
| 2,731,435 | Johnson et al. | Jan. 17, 1956 |
| 2,828,221 | McWherter | Mar. 25, 1958 |
| 2,828,223 | McWherter | Mar. 25, 1958 |

OTHER REFERENCES

Wyandotte: "Information of Applications of Pluronics," Mar. 1, 1952, pages 1, 2, 7 and 8.

Wyandotte: "Pluronics," a New Series of Nonionic Surface Active Agents, page 2, September 1952.